United States Patent [19]

Oaks

[11] 4,181,456
[45] Jan. 1, 1980

[54] CUTTING TOOL

[75] Inventor: Ronald R. Oaks, North Tonawanda, N.Y.

[73] Assignee: Niagara Cutter Inc., North Tonawanda, N.Y.

[21] Appl. No.: 867,337

[22] Filed: Jan. 6, 1978

[51] Int. Cl.² ............................................. B26D 1/12
[52] U.S. Cl. ................................... 407/38; 407/41; 407/49; 407/94; 407/108
[58] Field of Search ...................... 407/38, 41, 42, 45, 407/49, 94, 95, 108, 120

[56] References Cited

U.S. PATENT DOCUMENTS

| | | | |
|---|---|---|---|
| 1,664,083 | 3/1928 | Miller | 407/49 |
| 1,733,657 | 10/1929 | Ericson | 407/49 |
| 2,021,188 | 11/1935 | Lovejoy | 407/41 |
| 2,169,482 | 8/1939 | West | 407/45 |

*Primary Examiner*—Leonidas Vlachos
*Attorney, Agent, or Firm*—Sommer & Sommer

[57] ABSTRACT

An improved cutting tool has a blade removably secured to a movable body. The body is provided with an elongated slot extending into the body from its outer surface and arranged transversely of the direction of tool movement. This slot is bounded by spaced leading and trailing wall surfaces arranged to face one another and separated by an intermediate base surface. A blade is preferably arranged in the slot such that its leading surface is in area contact with the body leading wall surface. The trailing surface of the blade is provided with a plurality of serrations. A wedge, having a plurality of serrations on its leading surface, is insertable into the slot between the blade and the body trailing wall surface. The serrations on the blade and wedge mesh and interlock with one another, and permit the blade to be incrementally positioned relative to the wedge. A tongue extending outwardly from the wedge trailing surface is insertable into a cooperative groove recessed in the body trailing wall surface. The interlocked tongue and groove prevent the wedge from moving relative to the body in a direction transverse to the longitudinal axis of the tongue.

6 Claims, 8 Drawing Figures

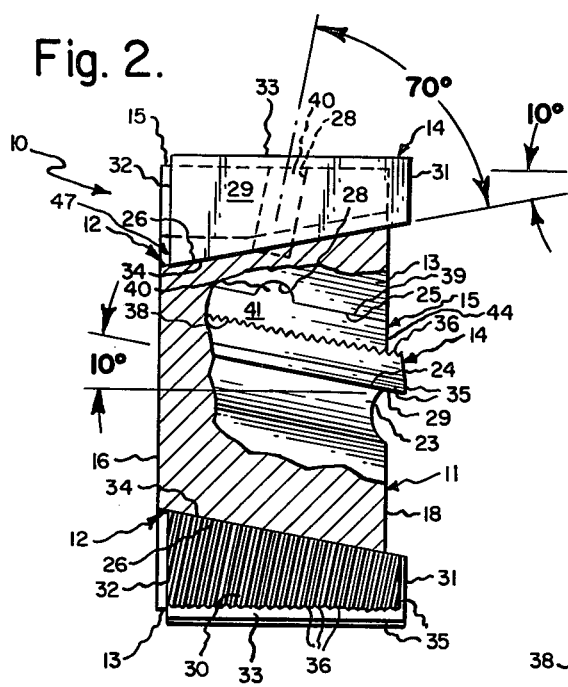
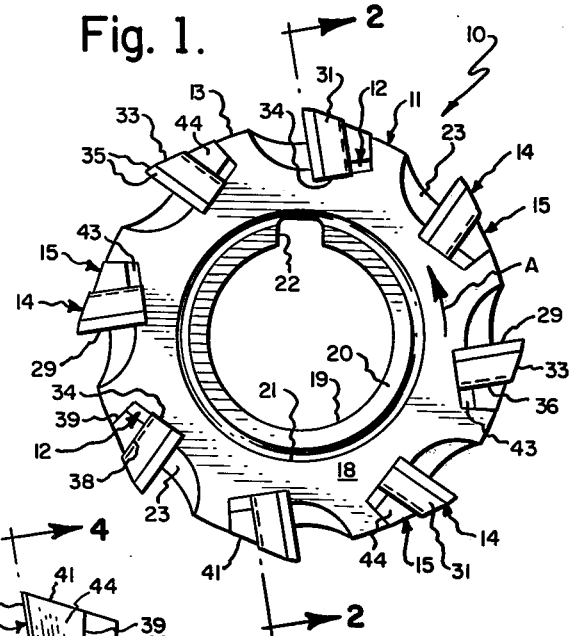
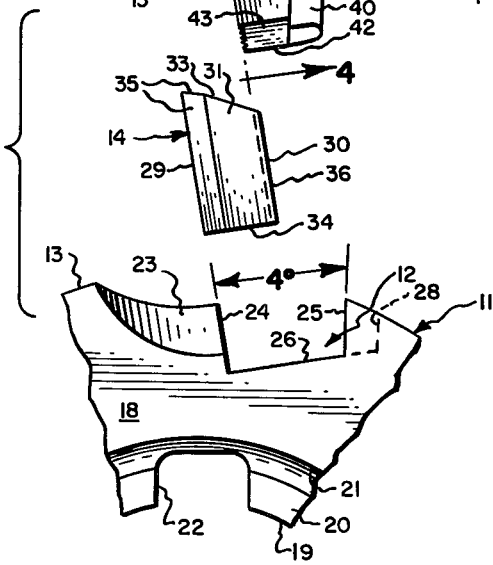
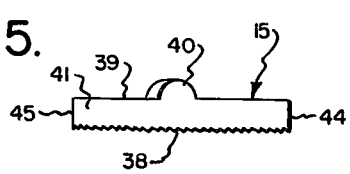
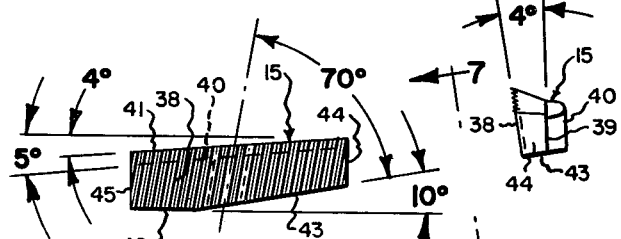
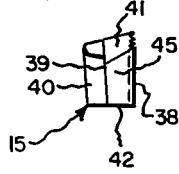
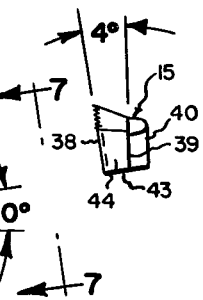
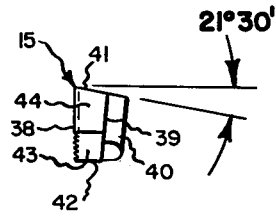

4,181,456

CUTTING TOOL

BACKGROUND OF THE INVENTION

1. Field of the Invention

The present invention relates generally to the field of cutting tools, and more particularly to an improved cutting tool having one or more blades removably mounted on a body.

2. Description of the Prior Art

The concept of providing a cutting tool having one or more blades removably mounted on a body, is broadly old, and is typically shown in U.S. Pat. No. 2,547,789.

Indeed, it is also shown to provide a slot in such body member, and to hold a blade in such slot by means of a wedge. This is shown in the aforesaid patent, and in U.S. Pat. Nos. 2,916,804 and 2,690,610. The aforesaid U.S. Pat. No. 2,916,804 also discloses meshing serrated surfaces on the wedge and blade to provide an adjustable interlock therebetween.

However, the holding integrity of such wedge and blade combination may be further insured by providing a positive interlock between the wedge and body member.

SUMMARY OF THE INVENTION

The present invention provides an improved cutting tool which broadly comprises a body, a blade, and a wedge. The body is provided with a slot extending into the body from a surface thereof. The slot is bounded by spaced leading and trailing wall surfaces arranged to face one another and separated by an intermediate base surface. The blade is arranged in the slot, and has leading and trailing surfaces. The wedge is arranged in the slot between the blade and one of the body wall surfaces. The wedge has leading and trailing surfaces, one of which opposes one of the blade surfaces. One of the blade surfaces has elongated serrations which are adapted to mesh and interlock with cooperative serrations on said one of the wedge surfaces. Elongated tongue and groove means are arranged between the other of the wedge and bodywall surfaces. Such tongue and groove means extends in substantially the same direction as do the blade and wedge serrations.

Accordingly, one general object of the present invention is to provide an improved cutting tool.

Another object is to provide an improved cutting tool having one or more blades removably mounted on a body or carrier.

Another object is to provide a cutting tool having improved means for securing or locking a removable blade to a body.

Still another object is to provide a cutting tool having improved means for permitting incremental adjustment of blade position relative to a wedge and body.

These and other objects and advantages will become apparent from the foregoing and ongoing specification, the drawings, and the appended claims.

BRIEF DESCRIPTION OF THE DRAWINGS

FIG. 1 is a front elevation of an improved cutting tool, this embodiment being a shell mill cutter having eight blades and wedges operatively arranged in a corresponding number of slots spaced circumferentially about the outer surface of a rotatable body.

FIG. 2 is a left side elevational view of the cutting tool depicted in FIG. 1, and having a portion of the body broken away to illustrate the upper blade leading surface in elevation, showing a portion of an intermediate blade assembly in side elevation, and showing the lower blade serrated trailing surface in elevation, this view being taken generally on line 2—2 of FIG. 1.

FIG. 3 is an enlarged fragmentary front elevational view of the upper portion of the tool shown in FIG. 1, and illustrating the associated blade and wedge in an exploded relationship to the uppermost body slot.

FIG. 4 is an elevational view of the wedge leading surface, this view taken generally on line 4—4 of FIG. 3.

FIG. 5 is a left side elevation of the wedge depicted in FIG. 4.

FIG. 6 is a top plan view of the wedge depicted in FIG. 4.

FIG. 7 is a view taken generally on line 7—7 of FIG. 4.

FIG. 8 is a right side elevation of the wedge shown in FIG. 4.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

As used herein, the terms "leading" and "trailing" are intended to relate to the direction of tool travel during cutting.

Referring now to the drawing figures, and more particularly to FIGS. 1 and 2 thereof, the invention provides an improved cutting tool, of which the presently preferred embodiment is generally indicated at 10. This improved cutting tool 10 is shown as broadly including a substantially cylindrical body 11 provided with eight circumferentially-spaced elongated slots 12 extending into the body from the outer surface 13 thereof, a blade 14 arranged in each of slots 12, and a wedge 15 arranged in each of slots 12 and operable to secure the blade to the body.

As best shown in FIGS. 1 and 2, the body 11 has a planar annular vertical rear face 16; a planar annular vertical front face 18; and a central axial through opening bounded by a cylindrical surface 19 extending forwardly from rear face 16, a forwardly-facing annular vertical shoulder surface 20, and a cylindrical surface 21 continuing forwardly therefrom and joining front face 18. In the embodiment shown, the opening is provided with a longitudinal keyway 22 to provide a means for preventing relative rotation between the body and an arbor or spindle (not shown) upon which the improved cutter is mounted. When cutting, the tool is rotated in a counterclockwise direction as viewed in FIG. 1, represented by arrow A.

As previously noted, the disclosed embodiment of body 11 is provided with eight circumferentially-spaced slots 12 arranged at equal intervals. As best shown in FIG. 1, each slot 22 is immediately preceded by a chip flute 23. The slots 12 are shown as being parallel to one another, and appear in side elevation to be elongated in a direction inclined at an angle of approximately ten degrees with respect to a line parallel to the longitudinal axis of the body (FIG. 2). As best shown in FIG. 3, each slot is transversely bounded or defined by a planar leading wall surface 24, a planar trailing wall surface 25 spaced from and arranged to face leading wall surface 24, and an intermediate planar base surface 26 joining wall surfaces 24, 25 at the bottom of the slot. In the preferred embodiment, the leading and trailing wall surfaces 24, 25 are not parallel to one another, but converge inwardly of the body member at an acute included angle of four degrees (FIG. 3). Moreover, the slot base surface 26 is shown in FIG. 2 as being generally forwardly-inclined along its longitudinal extent at an acute included angle of about ten degrees with respect to the body outer surface 13, for a purpose hereinafter explained. Each slot is shown as being further provided with an elongated semi-circular groove 28 extending into the body from trailing wall surface 25. In the illustrated embodiment, the longitudinal axis of groove 28 is inclined at an angle of seventy degrees with respect to the slot base surface 26 (FIG. 2).

Referring now to FIGS. 2 and 3, each of blades 14 is shown as being a plate-like member having a trapezoidal leading surface 29, and a smaller area trapezoidal trailing surface 30. As best shown in FIG. 2, each blade has a planar front end face 31, a planar rear end face 32, an outer face 33, and an inner face 34 adapted to slidably engage slot base surface 26. When the blade leading surface 29 is viewed in elevation (FIG. 2), the blade bottom and outer surfaces 34, 33 appear to converge at an angle of ten degrees. In other words, the angle of blade taper is equal to the angle of slot taper so that the blade may be adjustably positioned in the slot to vary the distance of the blade outer and front faces 33, 31 beyond the body outer and front surfaces 13, 18, and to compensate for wear of the cutting edges of the blade. Marginal portions of blade front and outer faces 31, 33 are suitably sharpened by a grinding operation, such ground areas being indicated by lands 35. While each blade is of substantially uniform thickness between its leading and trailing surfaces 29, 30, such trailing surfaces 30 are shown as being provided with a plurality of parallel serrations 36, the longitudinal extent of which is substantially parallel to the axis of body groove 28. In the preferred embodiment, each blade 14 is inserted into a body slot 12 such that the body leading wall surface 24 and the blade leading surface 29 will be in area contact.

As best shown in FIGS. 1–3, a wedge 15 is arranged in each slot 12 between the blade trailing surface 30 and the body trailing wall surface 25. Referring now to FIGS. 4–8, each wedge is shown as being a specially configured member having a serrated leading surface 38, and an opposite smaller area planar trailing surface 39 from which an elongated half-round tongue 40 extends outwardly. The wedge leading and trailing surfaces 38, 39 are downwardly and inwardly tapered at an included angle of four degrees (FIG. 7) so that the wedge leading and trailing surfaces 38, 39 will engage the blade and body wall trailing surfaces 30, 25, respectively, in area contact when the wedge is inserted into the slot. Perimetrically, the wedge has a planar outer face 41, an inner face including planar surfaces 42, 43, and planar front and rear faces 44, 45, respectively. The longitudinal extent of the parallel serrations on the wedge leading surface 38 is parallel to the longitudinal axis of tongue 40. The longitudinal axis of tongue 40 is parallel to the longitudinal axis of body groove 28. Thus, the longitudinal extent of blade serrations 36 is parallel to the longitudinal extent of wedge serrations 38, and parallel to the longitudinal axis of tongue 40 and body groove 28.

It should be further noted that the blade is longer than the wedge along the longitudinal extent of the slot, and is higher than the wedge in a direction perpendicular to the slot base surface 26. The reason for this latter relationship is that the blade inner surface 34 is designed to be slidably moved along the slot base surface 26 to a position at which the blade outer and front faces extend beyond the body outer and front surfaces 13, 18 for a desired distance. Thereafter, the wedge may be press-fitted into its operative engagement with the blade and body wall surfaces. To accommodate dimensional tolerances in manufacturing the various structural elements, the height of the wedge in a direction perpendicular to the slot base surface 26 is deliberately made smaller than the height of the blade to insure that the wedge may be adequately driven into its operative blade securing position without contracting the slot base surface 26. The space 47 under a wedge 15 when arranged in a groove 12 allows a tool (not shown) to be inserted to pry up the wedge for removal. Inasmuch as the wedge tongue 40 must be inserted into the body groove 28, the position of the wedge relative to the body is predetermined. However, the meshing interlock between the wedge and blade serrations 38, 36 allows the blade to be positioned relative to the body at any of a large plurality of incremental positions.

At the same time, it should be noted that the longitudinal axis of the wedge tongue 40 and the body groove 28, as well as the longitudinal extent of the blade and wedge serrations, do not extend radially of the body. In the preferred embodiment, the longitudinal axis of the tongue and groove is inclined at an angle of seventy degrees with respect to the slot base surface 26 (FIG. 2) so as to inhibit the tendency of the wedge from being centrifugally thrown from the slot when the cutter is rotated.

The serrations 36 and 38 are similar and may be of any suitable size as to depth, spacing and angularity. Typically, these serrations have a depth and spacing of one millimeter with right angles between adjacent sides. While the tongue 40 and groove 28 may be of any suitable mating size, and provided in any number per wedge and slot, it is preferred to provide a single tongue and groove. This allows a strong tongue to be formed on the wedge, and facilitates machining the groove as a recess in body wall surface 25. Also, binding is avoided when the wedge is driven into a slot, as might occur if two or more tongues were provided per wedge and they or their grooves might not be perfectly parallel or spaced the same. Typically, the tongue and groove are semi-circular in cross-section, and have a radius of $\frac{1}{8}$ inch. In any event, the number of tongues on one face of the wedge should be substantially fewer in number and materially larger in size and cross-section than the serrations on the other face of this wedge.

Of course, various modifications and changes may be made. For example, while the preferred embodiment of the improved cutting tool is shown as being a shell mill cutter, the principle of the invention could, if desired, be applied to other types of rotary cutters, not necessarily limited to milling cutters, or to other types of linearly movable cutters, such as broaches and the like. If desired, the respective positions of the blade and wedge could be reversed such that the wedge is arranged ahead of the blade. While this might require some minor modification of the configuration of the blade and wedge, such changes are regarded to be well within the ambit of one skilled in this art. The number or spacing of such slots about or along the cutter is not deemed to be critical. Also, the slot base surface 26 need not necessarily be planar, as shown. Alternatively, such base surface may be stepped in transverse cross-section to provide one base surface level for engagement with the blade inner surface, and another base surface level (preferably deeper) to insure that the wedge will not "bottom out" when inserted. Nor is the angle between the axis of the wedge tongue and the slot base surface, to be regarded as limited to the specific angle employed in the preferred embodiment.

Therefore, while the presently preferred embodiment of the improved cutter has been illustrated and described, and several modifications thereof discussed, persons skilled in this art will appreciate that various additional modifications may be made without departing from the spirit of the invention, as defined in the following claims.

What is claimed is:

1. A cutting tool, comprising:
 a body provided with an elongated slot extending into said body from a surface thereof, said slot being bounded by spaced and facing leading and trailing wall surfaces separated by an intermediate base surface, said wall surfaces being inclined toward each other convergently inwardly of said slot away from said body surface, said base surface being inclined in the direction of such slot elongation;
 a blade arranged in said slot and having leading and trailing blade surfaces, said blade having a cooperatively inclined bottom surface adapted to slidably engage said body base surface;
 single means holding said blade in said slot including a wedge removably arranged in said slot between said blade and are of said wall surfaces and having leading and trailing wedge surfaces, one of which opposes one of said blade surfaces;
 elongated blade serrations on said one blade surface;
 elongated serrations on said one wedge surface and interlocking with said blade serrations; and
 elongated tongue and groove means arranged between the other of said wedge and wall surface and extending in substantially the same longitudinal direction as said blade and wedge serrations, said wedge being adapted to be driven inwardly of said slot toward said base surface to hold said blade in said slot and being adapted to be removed outwardly away from said base surface of said slot to free said blade.

2. A cutting tool according to claim 1, wherein said blade is longer than said wedge in a direction parallel to the longitudinal extent of said slot.

3. A cutting tool according to claim 1, wherein said blade is higher than said wedge in a direction perpendicular to said base surface.

4. A cutting tool according to claim 1, wherein said blade is longer than said wedge in a direction generally perpendicular to the longitudinal extent of said serrations, and is higher than said wedge in a direction extending generally parallel to the longitudinal extent of said serrations.

5. A cutting tool according to claim 1, wherein said tongue and groove means comprises a single tongue on said other wedge surface and a single groove in said one body wall, said groove being longer than said tongue.

6. A cutting tool according to any one of claims 1 through 5, wherein said body is rotatable about an axis, and said longitudinal direction of said blade and wedge serrations and said tongue and groove means is nonradial with respect to said axis.

* * * * *